United States Patent [19]

Sakakihara et al.

[11] Patent Number: 5,142,865
[45] Date of Patent: Sep. 1, 1992

[54] HYDRAULIC BOOSTER

[75] Inventors: Yuichiro Sakakihara, Hekinan; Michiharu Nishii, Toyota, both of Japan

[73] Assignee: Aisin Seiki Kabushiki Kaisha, Kariya City, Japan

[21] Appl. No.: 674,901

[22] Filed: Mar. 26, 1991

[30] Foreign Application Priority Data

Mar. 31, 1990 [JP] Japan .................. 2-34301[U]

[51] Int. Cl.$^5$ .................................... B60T 13/20
[52] U.S. Cl. .................................... 60/555
[58] Field of Search ..................... 60/547.1, 555

[56] References Cited

U.S. PATENT DOCUMENTS

| 3,733,968 | 5/1973 | Boch | 91/469 |
| 4,761,042 | 8/1988 | Seibert et al. | 60/547.1 |
| 4,903,487 | 2/1990 | Leiber | 60/547.1 |
| 5,065,573 | 11/1991 | Nomura et al. | 60/555 |
| 5,065,580 | 11/1991 | Nishii | 60/547.1 |

Primary Examiner—Edward K. Look
Assistant Examiner—F. Daniel Lopez
Attorney, Agent, or Firm—Burns, Doane, Swecker & Mathis

[57] ABSTRACT

There is disclosed an automotive hydraulic brake booster in which a driver feels a brake pedal moving smoothly as he or she pushes down on the brake pedal. The booster includes a housing connected with a master cylinder, an input rod, a booster chamber formed in the housing, a power piston sliding inside the booster chamber, and a reaction piston connected to the input rod and inserted in a hole formed in the power piston. A linkage is connected to a valve for boosting the force supplied to the master cylinder and connected to the reaction piston. The reaction piston can move a given distance relative to the power piston in response to the input rod, this distance being determined by a stop. The stop and the connection between the input rod and the reaction piston are on the same side of the connection between the linkage and the reaction piston. A reaction chamber is formed in said hole by the reaction piston. A resilient member is mounted between both metallic pistons to mitigate the collision between both pistons when the reaction piston moves the given distance relative to the power piston.

6 Claims, 1 Drawing Sheet

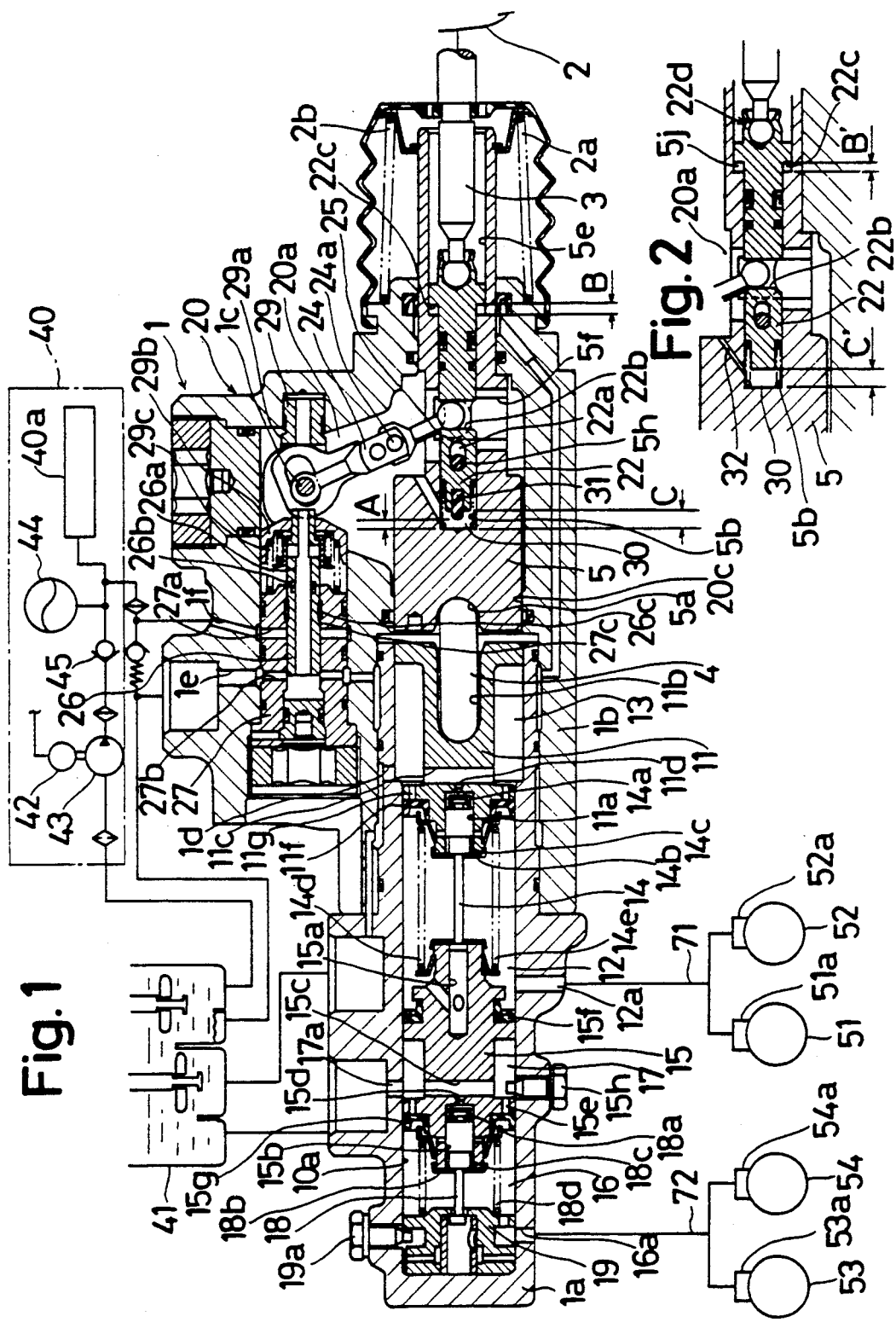

HYDRAULIC BOOSTER

FIELD OF THE INVENTION

The present invention relates to a hydraulic booster used in a hydraulic brake system installed on a vehicle.

BACKGROUND OF THE INVENTION

A hydraulic foot-operated service brake system installed on a vehicle is equipped with a power-assisting device such as a servo or booster so that only a relatively light pedal force is required to brake the vehicle. Compressed air, negative pressure in the intake manifold (negative pressure booster), or fluid pressure (hydraulic booster) is used as the power source.

A hydraulic booster utilizing fluid pressure makes use of hydraulic pressure supplied by a hydraulic pressure source to augment the force applied to a hydraulic brake control device such as a master cylinder in response to movement of the brake pedal. A hydraulic booster of this construction is described, for example, in Japanese Patent Laid-Open No. 205545/1986. This known hydraulic booster comprises a housing connected with a master cylinder, an input piston, a power piston sliding in a booster chamber formed inside the housing, and a reaction piston inserted in a hole formed in the power piston. The power piston responds to the input rod and transmits boosted force to the master cylinder. The reaction piston can move a given distance relative to the input rod in response to the power piston. A reaction chamber communicating with the booster chamber is formed by the reaction piston within said hole in the power piston.

In the above-described conventional booster, both power piston and reaction piston are made of metal, and their relative movement is restricted by bearing against each other. Therefore, when the brake pedal is pushed down suddenly, or when the brake pedal force is so strong that the capability of the servo is surpassed, a clunk is produced because both pistons bear against each other. Hence, the driver feels uncomfortable in pushing down on the brake pedal.

SUMMARY OF THE INVENTION

It is an object of the invention to provide a hydraulic booster which is simple in structure and permits the driver to feel less uncomfortable in pushing down on the brake pedal.

The above object is achieved by a hydraulic booster comprising: a housing connected with a master cylinder; a booster chamber formed in the housing; an input rod; a power piston sliding in the booster chamber in response to the input rod and transmitting boosted output force to the master cylinder; a reaction piston inserted in a hole formed in the power piston so as to be movable a given distance relative to the power piston in response to the input rod; a reaction chamber formed by the reaction piston inside said hole and communicating with the booster chamber; and a shock-absorbing means which is mounted between the reaction piston and the power piston and which, when the reaction piston moves the given distance relative to the power piston, lessens the collision between both pistons.

In the novel hydraulic booster, when the brake pedal is suddenly pushed down, or when the force applied to the brake pedal is so strong that the capability of the servo is exceeded, the reaction piston moves the given distance relative to the power piston in response to the input rod. At this time, movement of the reaction piston is mitigated by the shock-absorbing means until the reaction piston collides against the power piston, thereby limiting the movement of the reaction piston. Consequently, both pistons are prevented from colliding against each other. As a result, the driver feels less uncomfortable in pressing down on the brake pedal.

Other objects and features of the invention will appear in the course of the description thereof which follows.

BRIEF DESCRIPTION OF THE DRAWING

FIG. 1 is a cross-sectional view of a hydraulic booster according to the invention; and FIG. 2 is an enlarged cross section of the hydraulic control valve shown in FIG. 1, and in which a spool is in its boost position.

DETAILED DESCRIPTION OF THE INVENTION

Referring to FIG. 1, there is shown a brake liquid pressure control apparatus, generally indicated by reference numeral 1. This apparatus 1 comprises a tandem master cylinder 10 and a hydraulic booster 20 according to the invention. The force applied to the brake pedal 2 of a vehicle on which the control apparatus 1 is installed is transmitted to the brake via an input rod 3. Hydraulic pressure coming from a reservoir 41 or a hydraulic pressure source 40 is appropriately controlled according to the transmitted force and supplied to wheel cylinders 51a–54a at the front wheels 51, 52 and the rear wheels 53, 54, respectively, via a first hydraulic line 71 and a second hydraulic line 72.

The master cylinder 10 has a housing 1a provided with a hole 10a in which a first piston 11 and a second piston 15 are inserted so as to be slidable in a liquid-tight manner. A small land portion and a large land portion are formed at opposite ends of the first piston 11. The cylinder hole 10a is a stepped hole having a small portion and a large portion which receive the land portions, respectively. A cup seal 11f is fitted over the small land portion of the first piston 11. The small land portion is accomodated in the small portion of the cylinder hole 10a in such a way that it can slide in a liquid-tight manner. A first liquid supply chamber 13 is formed between the land portions in the cylinder hole 10a. The large portion of the hole 10a is in communication with the reservoir 41 by way of a port 1d.

Holes 11a and 11b extend axially from opposite ends of the first piston 11 toward the center. The first piston 11 is further provided with a radially extending hole 11c and an axially extending hole 11d. The hole 11c opens into the first liquid supply chamber 13. The hole 11d places the hole 11c in communication with the hole 11a. A valve body 14a which is mounted at one end of a valve rod 14 is slidably received in the hole 11a and disposed opposite to the hole 1d. A retainer 14b limits movement of the valve body 14a toward the second piston 15. The small land portion of the first piston 11 is formed with a hole 11g extending axially therethrough. This hole is covered with the cup seal 11f to form a check valve. A spring 14c is mounted between the valve body 14a and the retainer 14b to bias the valve body 14a toward the hole 11d at all times. An output rod 4 is held in the hole 11b.

Cup seals 15f and 15g are fitted over land portions, respectively, which are formed at opposite ends of the second piston 15. A second liquid supply chamber 17 that is in communication with the reservoir 41 through a port 17a is formed between the land portions inside the cylinder hole 10a. A first pressure chamber 12 is formed between the cup seal 15f on the second piston 15 and the cup seal 11f on the first piston 11 and in communication with the wheel cylinders 51a, 52a at the front wheels 51, 52, respectively, via the first hydraulic line 71.

The second piston 15 is provided with a hole 15a that extends axially and opens into the first pressure chamber 12. The valve rod 14 has an enlarged end portion which is slidably received in the hole 15a. The retainer 14d restricts movement of the rod 14 toward the first piston 11.

A return spring 14e is stretched between the retainer 14d of the second piston 15 and the retainer 14b of the first piston 11 to bias the first piston 11 and the second piston 15 away from each other. Normally, therefore, both ends of the valve rod 14 engage the retainers 14b and 14d, respectively. Under this condition, the valve body 14a is spaced a given distance from the hole 11d. The brake fluid which is supplied into the first liquid supply chamber 13 from the reservoir 41 via the port 1d flows into the first hydraulic chamber 12 through the hole 11g in the first piston 11 and through the holes 11c, 11d, and 11a. When at least one of the first piston 11 and the second piston 15 slides against the action of the return spring 14e so as to move toward each other, the holes 11g and 11d are plugged up by the cup seal 11f and the valve body 14a, respectively. The first hydraulic chamber 12 is closed except for the outlet of the port 12a.

An axially extending hole 15b is formed in the end surface of the second piston 15 on the side of the bottom surface of the cylinder hole 10a. The hole 15b is in communication with a radially extending hole 15c via an axially extending hole 15d. The hole 15c opens into the second liquid supply chamber 17. A valve body 18a formed at one end of the valve rod 18 is slidably received in the hole 15b and disposed opposite to the hole 15d. A retainer 18b limits movement of the valve body 18a toward the bottom surface of the cylinder hole 10a. The land portion of the second piston 15 that is on the side of the cylinder hole 10a is provided with a hole 15e extending axially therethrough. This hole 15e is covered with the cup seal 15g to form a check valve. A spring 18c is interposed between the valve body 18a and the retainer 18b to urge the valve body 18a towards the hole 15d at all times. A stopper bolt 15h is screwed to the housing 1a, the head of the bolt protruding into the second liquid supply chamber 17. The head of the bolt bears on the land portion of the second piston 15 on the side of the bottom surface of the cylinder hole 10a to restrict movement of the second piston 15 toward the first piston 11.

A holder 19 is fixedly mounted on the bottom surface of the cylinder hole 10a by a stopper bolt 19a between the second piston 15 and the bottom of the cylinder hole 10a. The enlarged end portion of the valve rod 18 engages the holder 19 so as to be able to disengage therefrom. Thus, movement of the valve rod 18 toward the second piston 15 is limited. A second hydraulic chamber 16 is formed between the bottom surface of the cylinder 10a and the cup seal 15g on the second piston 15.

A return spring 18d is stretched between the retainer 18b of the second piston 15 and the holder 19 to bias the second piston 15 and a third piston 19 away from each other. Normally, both ends of the valve rod 18 are anchored to the retainer 18b and the holder 19, respectively. At this time, the valve body 18a is spaced a given distance from the hole 15d. The brake fluid that is supplied into the second liquid supply chamber 17 from the reservoir 41 via the port 17a enters the second hydraulic chamber 16 through the hole 15e in the second piston and through the holes 15c, 15d, and 15b. When the second piston 15 slides toward the third piston 19 against the action of the return spring 18d, the holes 15e and 15d are closed by the cup seal 15g and the valve body 18a, respectively. As a result, the second hydraulic chamber 16 is closed except for the outlet of the port 16a.

The hydraulic booster 20 has a booster chamber 20a formed in a housing 1b coupled to the housing 1a. A hole 20c is substantially coaxial with the cylinder hole 10a and connects together both chambers. A power piston 5 is inserted in the hole 20c so as to be slidable in a liquid-tight manner. A retainer 2a is mounted at the end of the power piston 5 on the side of the brake pedal 2. A spring 2b is stretched between the retainer 2a and the housing 1b to urge the piston 5 toward the brake pedal 2. A shoulder portion is formed in the center of the power piston 5 and abuts against the housing 1b to prevent the piston 5 from making sliding movement toward the brake pedal 2.

A hole 5a is formed at the end of the power piston 5 on the side of the first piston 11. The piston 5 is further provided with a hole 5b and a larger hole 5e, the hole 5b being formed around the central axis. A reaction piston 22 is held in the hole 5a slidably, and a reaction chamber 30 communicating with the booster chamber 20a is formed between the top surface of the piston 22 and the bottom surface of the hole 5b.

The reaction piston 22 has a slot 22a and a hole 22b which extends through the piston 22 at right angles to the slot 22a. This slot 22a extends axially of the piston 22 along a diameter of the piston. A pin 5h fixed to the power piston 5 is fitted in the slot 22a to limit at least sliding movement of the reaction piston 22 relative to the piston 5 toward the brake pedal 2. One end of the input rod 3 is connected with the brake pedal 2, while spherical head portion is formed at the other end. The head portion is inserted in the hole 5e formed in the piston 5 and retained by a connection point 22d defined by a protrusion formed on the inner surface of the end of the opening in the piston 22. A hole 5f which is larger in diameter than the hole 22b extends radially through the piston 5. When the piston 22 is closest to the brake pedal 2, the hole 5f overlaps with the hole 22b in a coaxial relation with the hole 22b. The output rod 4 is received in the hole 5a formed in the power piston 5.

A support lever 24 that swings inside the booster chamber 20a has a spherical head portion fitted in the hole 22b formed in the reaction piston 22. One end of the lever 24 is pivotally mounted to the housing 1b by a pin 1c. A control lever 25 is coupled to the lever 24 by a pin 24a so as to be rotatable relative to the lever 24. One end of the lever 25 is fitted in the hole 5f formed in the piston 5. A hole is formed around the pin 1c for the support lever 24 at the other end of the control lever 25. If the power piston 5 is pushed toward thw brake pedal 2, and if the reaction piston 22 slides toward the output rod 4, then a force is applied to the support lever 24 so that it rotates in a clockwise direction about the pin 1c. Since one end of the control lever 25 is retained in the hole 5f formed in the power piston 5 at this time, the other end of the control lever 25 is rotated in a counterclockwise direction about the pin 24a and moves in the same direction as the direction of sliding movement of the reaction piston 22. This end of the lever 25 moves a distance B until a stop surface 22c of the piston 22 bears against a stop surface 5j of the power piston 5. In this way, the lever 25 is displaced. Both the stop surface 22c and the connection point 22d are spaced from the hole 22b in the same direction.

A spool valve hole that extends substantially parallel to the power piston 5 is formed in the housing 1b and in communication with the booster chamber 20a. A spool valve serving as a hydraulic pressure control valve is fitted in the spool valve hole. A spool hole extending substantially parallel to the power piston 5 is formed in a cylinder 27, and a spool 26 is slidably received in this spool hole. Thus, the spool valve is constituted by the cylinder 27 and the spool 26. The spool 26 is provided with a hole 26a extending axially therethrough and also with radially extending restriction holes 26b. The restriction holes 26b which are opposite to each other are in communication with the hole 26a. One end of the spool 26 is located within the booster chamber 20a and coupled to one end of a control rod 29. The other end of the rod 29 is slidably held to the housing 1b. The head portion of the control lever 25 is fitted in a hole 29a extending radially through the rod 29.

A spring 29c is stretched between a holder 29b and the cylinder 27. The holder 29b is supported to one end of the control rod 29 and anchored to one end of the spool 26. Thus, the spool 26 is biased toward the control lever 25 whose one end engages the holder 29b. The hole 26a is designed to be kept in communication with the booster chamber 20a at the joint between the spool 26 and the control rod 29.

At the position at which the control lever 25 stops, or the position at which the spool 26 stops, the other end of the hole 26a in the spool 26 is in communication with the reservoir 41 via a hole 27b and a drain port 1e. The hole 27b extends radially in the cylinder 27. The drain port 1e is formed in the housing 1b. Therefore, the spool 26 is retained in its stop position, and the inside of the booster chamber 20a is in communication with the reservoir 41. The cylinder 27 is provided with a hole 27a that can communicate with an accumulator 44 via the port 1f on the side of the control rod 29 and spaced a given distance from the hole 27b. At this position, the hole 27a is disconnected from the accumulator by the outer periphery of the spool 26. An annular groove 27c is formed between the hole 27a and the end surface of the spool 26 on the side of the control rod 29. The outer surface of the spool 26 has an annular groove 26c opposite to the annular groove 27c. A plug is fitted in a liquid-tight manner in the opening of the cylinder 27 on the side of the booster chamber.

In the present example, in the inoperative position shown in FIG. 1, a resilient member 31 made of rubber or other similar material is mounted at one end of the reaction piston 22. The head portion of the resilient member 31 is spaced a distance A from the bottom of the hole 5b. This distance A is set less than the distance B that the reaction piston 22 moves relative to the power piston 5. In the condition shown in FIG. 1, the relations A<B<C hold.

The hydraulic pressure source 40 includes a hydraulic pump 43 driven by an electric motor 42. The input of the presure source 40 is connected with the reservoir 41, while the output is connected with the accumulator 44 via a check valve 45. Hydraulic pressure is supplied to a desired portion via the accumulator 44. The motor 42 is turned on and off according to the output signal from a pressure sensor 40a by a control circuit (not shown) to maintain the hydraulic pressure at a desired value.

The operation of the hydraulic booster constructed as described aboved is next described. In the illustrated condition, the brake pedal 2 is released. In this state, the first pressure chamber 12 of the master cylinder 10 is in communication with the first liquid supply chamber 13 via the hole 11d. These chambers 12 and 13 are in communication with the wheel cylinders 51a and 52a, and the reservoir 41, respectively. The brake fluid filling these chambers is subjected to the pressure inside the reservoir 41, i.e., under the atmospheric pressure. The second pressure chamber 16 and the second liquid supply chamber 17 are in communication with the reservoir 41 and so the brake fluid contained in these chambers 16 and 17 are substantially under the atmospheric pressure. The wheel cylinders 53a and 54a which are in communication with the reservoir via the port 16a and the hydraulic line 72 are under the same pressure. When the hydraulic pressure source 40 is driven, hydraulic pressure is supplied to the hole 27a of the hydralic booster 20 but the booster 20 does not operate, because the hole 27a is disconnected from the pressure source 40.

When the brake pedal 2 is pushed down, the reaction piston 22 is pushed via the input rod 3 and moves relative to the power piston 5. Then, the control lever 25 rotates in a counterclockwise direction relative to the support lever 24, so that the end of the lever 25 pushes the spool 26 via a resilient member 31 and the holder 29b. As a result, the spool 26 moves toward the plug, and the hydraulic booster assumes an operative condition. The hole 27b is disconnected from the booster chamber 20a. The hole 27a is placed in communication with the restriction holes 26b via the annular grooves 26c and 27c. Hydraulic pressure from the hydraulic pressure source 40 is admitted into the booster chamber 20a via the hole 27a, the annular grooves 26c and 27c, the restiction holes 26b and the hole 26a, thus pushing the power piston 5. In this way, boosted force is given to the first piston 11. At the same time, reaction force is transmitted to the brake pedal 2 via the reaction piston 22. The power piston 5 is displaced relative to the reaction piston 22. Correspondingly, the spool valve 28 is actuated by the control lever 25. Consequently, the hydraulic pressure inside the booster chamber 20a is controlled to a desired value.

The power piston 5 operates in response to the position of the brake pedal 2 to actuate the first piston 11. When the first piston 11 moves a given distance, the valve body 14a closes the hole 11d, producing hydraulic pressure inside the first pressure chamber 12. This pressure is transmitted to the wheel cylinders 51a and 52a through the first hydraulic line 71. At the same time, the second pistion 15 is moved toward the bottom surface of the cylinder hole 10a. When the second piston 15 moves a given distance, the valve body 18a closes the hole 15d, thus creating hydraulic pressure inside the second pressure chamber 16. This pressure it transmitted to the wheel cylinders 53a and 54a via the second hydraulic line 72.

In the present example, the resilient member 31 makes a resilient contact with the bottom of the hole 5b before the reaction piston 22 responding to the input rod 3 moves the given distance B relative to the power pistion 5. Therefore, if the brake pedal 2 is pressed down abruptly, or if the force applied to the pedal is so strong that the capability of the servo is surpassed, then the reaction piston 22 is prevented from colliding against the power piston 5. Hence, the driver is not jarred when both pistons bear against each other; rather the driver feels the pedal moving smoothly. Also, the resilient member 31 limits rapid movement of the reaction piston 22 and so it is unlikely that the spool 26 is moved rapidly via the control lever 25. This eleminates the possibility that excessive hydraulic pressure enters the booster chamber 20a. In consequence, a smooth feeling is given to the driver in operating the brake pedal.

FIG. 2 shows a hydraulic booster similar to the hydraulic booster described already in connection with FIG. 1 except for the following points. The reaction chamber 30 is in communication with the booster chamber 20a via a restriction passage 32. The space C' beween the bottom of the hole 5b and the head portion of the reaction piston 22 is set larger than the distance B' that the reaction piston 22 moves relative to the power piston 5. This example yields the same advantages as the foregoing example because of the provision of the restriction passage 32.

Although certain specific embodiments of the present invention have been shown and described, it is obvious that many modifications thereof are possible. The present invention, thereof, is not intended to be restricted to exact showing of the drawings and description thereof, but is considered to include reasonable and obvious equivalents.

What is claimed is:

1. A hydraulic braking mechanism, comprising:
   a housing connected with a master cylinder,
   an input rod movable by an operator, piston means connected to the input rod and slibable within the housing for applying a force to the master cylinder when the input rod is moved, said piston means comprising:
   a power piston slidable within the housing, and
   a reaction piston mounted in a first hole in the power piston and slidable relative to the power piston, the reaction piston being connected to the input rod at a connecting point,
   booster means mounted in the housing for boosting the force supplied to the master cylinder,
   motion transmitting linkage connected to the booster means and received within a second hole formed in the reaction piston for transmitting movement of the reaction piston to the booster means,
   shock absorbing means for damping the movement of the reaction piston relative to the power piston, and
   stop means for terminating movement of the reaction piston relative to the power piston, the stop means comprising a first stop surface on the power piston and a second stop surface on the reaction piston positioned to be engaged by the first stop surface, both the second stop surface and the connecting point being spaced in the same direction from the second hole.

2. A hydraulic braking mechanism according to claim 1, wherein the shock absorbing means comprises a resilient member interposed between the power piston and the reaction piston.

3. A hydraulic braking mechanism according to claim 2 including a reaction chamber defined between a wall of the power piston and a wall of the reaction piston, the wall of the reaction piston being located at the end of the reaction piston disposed opposite the connecting point, the resilient member being disposed within the reaction chamber and carried by one of the walls.

4. A hydraulic braking mechanism according to claim 3, wherein the housing forms a booster chamber in which the power piston slides, the reaction chamber communicating with the booster chamber by a passage.

5. A hydraulic braking mechanism according to claim 1 including a reaction chamber formed between a wall of the power piston and a wall of the reaction piston the shock absorbing means comprising a restricted passage communicating with the reaction chamber for controlling the discharge of fluid therefrom as relative movement between the reaction piston and the power piston reduces the size of the rection chamber.

6. A hydraulic braking mechanism according to claim 5, wherein the housing forms a booster chamber in which the power piston slides, the reaction chamber communicating with the booster chamber by means of the restricted passage.

* * * * *

UNITED STATES PATENT AND TRADEMARK OFFICE
CERTIFICATE OF CORRECTION

PATENT NO. : 5,142,865
DATED : September 1, 1992
INVENTOR(S) : Yuichiro SAKAKIBARA et al It is certified that error appears in the above-identified patent and that said Letters Patent is hereby corrected as shown below:

On title page, item [75], delete "Sakakihara" and insert -- Sakakibara --.

Signed and Sealed this

Fourteenth Day of September, 1993

Attest:

BRUCE LEHMAN

*Attesting Officer*     *Commissioner of Patents and Trademarks*